July 9, 1963
R. V. SCHAFER ETAL
3,096,944
DISINTEGRATING FRESHLY POLYMERIZED OLEFINS
WITH POLYMERIZATION INHIBITOR
Filed June 7, 1961
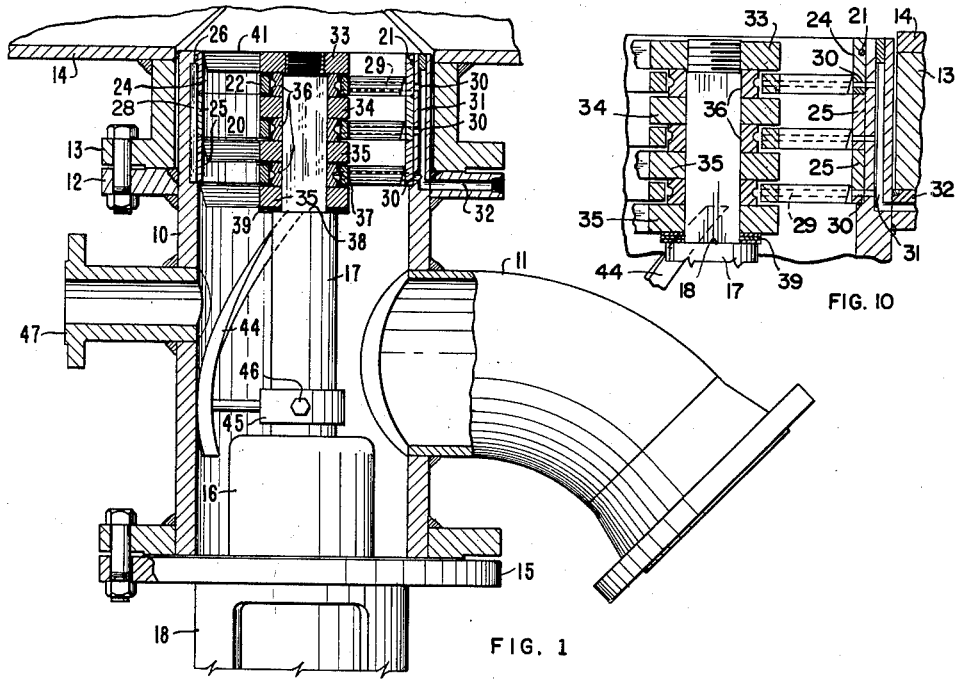
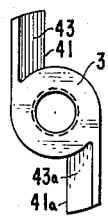
FIG. 2
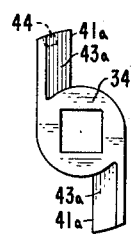
FIG. 3
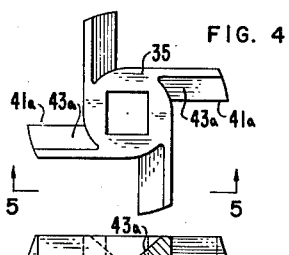
FIG. 4
FIG. 5
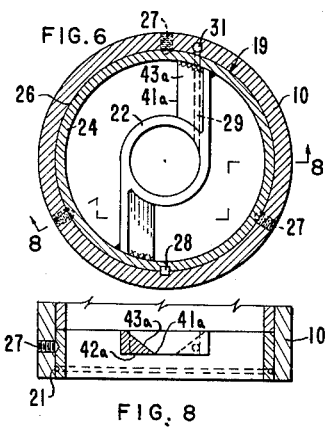
FIG. 6
FIG. 8
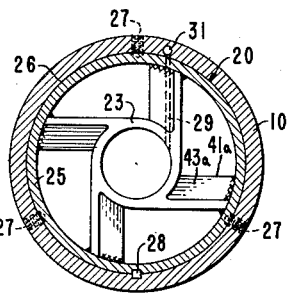
FIG. 7
FIG. 9
INVENTORS:
EARL S. HILL
RICHARD V. SCHAFER
BY: *Oswald H. Wilmore*
THEIR ATTORNEY 3,096,944
**DISINTEGRATING FRESHLY POLYMERIZED OLE-
FINS WITH POLYMERIZATION INHIBITOR**
Richard V. Schafer, Walnut Creek, and Earl S. Hill, Orinda, Calif., assignors to Shell Oil Company, New York, N.Y., a corporation of Delaware
Filed June 7, 1961, Ser. No. 115,433
6 Claims. (Cl. 241—15)

The invention relates to disintegrators and to a method of disintegrating solids wherein the latter are cut between relatively moving blades. More particularly, the invention is concerned with comminuting such solids in a stream which is prone to form deposits which would foul the disintegrator, e.g., would cause seizure of the moving parts. The deposited material may be the said solids themselves, as when they are highly adherent to walls, and/or material which enters the disintegrator in solution but separates therefrom as a precipitate or polymer.

The invention finds especial application to comminuting solid polymers carried in a polymer solution, e.g., polymers of mono-olefins and di-olefins. Such solid polymers in some instances are highly adherent to walls and are liable to form deposits which cause binding between the relatively moving parts of the disintegrator; in many cases solid polymers are formed in the polymer solution by continuing polymerization.

As a specific example, the invention is applicable to the treatment of the effluent stream from a chemical reactor wherein butadiene, dissolved in a hydrocarbon solvent, such as a solution of butene-1 and benzene is polymerized by means of a liquid cobalt chloride-ethyl aluminum sesquichloride catalyst, to form principally cis-1,4 polybutadiene, which polymer is dissolved in the hydrocarbon solvent. In this polymerization a small amount of insoluble, cross-linked polymer is formed. The latter is in the form of a gel which adheres tenaciously to walls, especially slowly moving surfaces, to form deposits which accumulate progressively and are insoluble in the polymer solution. It is often desirable to comminute this gel, which is carried in the polymer solution either from its inception or after being dislodged from reactor or conduit walls by mechanical means, by flowing the reactor effluent through a disintegrator, sometimes called a gel-chopper. A stabilizer may be injected into the said effluent prior to its entry into the disintegrator to check or inhibit further formation of the gel and to render the entrained gel non-adherent. However, there yet remains the possibility of incomplete checking of the polymerization as by only partial dispersal of the stabilizer in the effluent and likelihood that the fresh surfaces of the gel exposed by the cutting action may promote further formation of adherent solids, with danger of localized fouling of the disintegrator mechanism. Although most of the deposits are torn loose from the disintegrator blades by their shearing action, this consumes power and is not complete in regions wherein no blades are provided, e.g., near the shaft. These factors increase the shaft work required to operate the cutters. Also, deposits are apt to form when the disintegrator is stopped for any reason.

It is the object of this invention to protect the disintegrator against fouling by such adherent material by injecting a stabilizer directly to the zone adjoining juxtaposed, relatively moving parts to insure freedom from fouling.

In summary, the disintegrator comprises a plurality of relatively movable cutting elements providing open spaces for the passage of the dispersion of liquid and solids wherein ducts are provided, e.g., bores formed in stationary blades, by which a deposit-preventing fluid, a polymerization inhibitor, is fed directly to regions adjacent to juxtaposed, relatively moving parts, preferably between said parts, e.g., where the rotating shaft and the support structure of the rotor blades is continuously in close proximity to the support structure of other blades.

The invention will be described with reference to the accompanying drawing forming a part of this specification and showing one preferred embodiment by way of illustration, wherein:

FIGURE 1 is a vertical longitudinal sectional view of the disintegrator according to the invention;

FIGURES 2, 3 and 4 are inverted plan views of three different rotor blades used in the disintegrator;

FIGURE 5 is a sectional view taken on the line 5—5 of FIGURE 4;

FIGURES 6 and 7 are transverse sectional views of two different stator blades assemblies, mounted within the casing;

FIGURE 8 is a sectional view taken on the broken line 8—8 of FIGURE 6;

FIGURE 9 is a perspective view of a spacer; and

FIGURE 10 is an enlarged fragmentary sectional view showing parts of FIGURE 1.

Referring to the drawings in detail, the disintegrator comprises a cylindrical housing 10 having an open intake end at the top and a flanged lateral nozzle 11 forming an outlet. The housing has a flange 12 for bolting to a supply pipe 13 leading from a conduit 14. The lower end of the housing is closed by a plate 15 which carries a running seal and bearing assembly 16 through which extends a drive shaft 17. The shaft is driven by an electric motor 18.

The cylindrical passage within the housing 10 contains a plurality of stationary cutter blade assemblies 19, 20, each comprising a plurality of blades extending eccentrically outward from a central hub 22 or 23 to a support ring 24 or 25. These assemblies are secured in the housing within a counterbored part 26 of the housing 10 by radial set screws 27 and held against rotation by a key 28. The rings 24, 25 are long enough to be in engagement and the ring 24 is sealed to the housing by an O-ring 21. One blade in each assembly has a passage 29 extending therethrough, open at each end, and in communication at their outer ends through radial ports 30 in the housing with an axial bore 31 in the housing 10. Stabilizing fluid is supplied to this bore via a communicating tube 32 extending out of the housing.

The drive shaft carries a plurality of rotary cutter blade assemblies 33, 34 or 35, separated by spacers 36, the latter being rotatable with the shaft within the hubs 22, 23 and having lengths to position the rotor blades closely adjacent to the stationary blades for coaction therewith. These spacers have peripheral grooves 37 to receive stabilizing fluid from the passages 29. The shaft may have a circular cross section from the motor to a shoulder 38 where shims 39 are placed to adjust the relation between stationary and rotor blades, a square cross section up to the end rotor blade 33, and be circular and externally threaded from there to the end. The end rotor blade 33 has an internally threaded hub by which it is secured to the shaft, thereby securing the other rotor blades. The rotor assemblies 34 and 35 and the spacers 36 have square openings in their hubs.

The stationary and rotor blade assemblies may have any desired number of blades; in the example shown each of the assemblies 19, 33 and 34 has two blades and the assemblies 20, and 35 have four blades each; the unit uses two each of assemblies 20 and 35 and one each of the others. Each blade has a knife edge 41 or 41a, a flat face 42 or 42a situated perpendicular to the shaft axis, and a bevelled face 43 or 43a. The rotor assemblies can be assembled on the shaft in various ways depending upon whether or not it is desired to induce flow. Thus, in the arrangement shown each of the bevelled faces acts to propel the fluid material from the inlet toward the outlet. However, by inverting some or all of these blades, the effect of the blade motion on the liquid movement can be made nil or even reversed. The last arrangement can be used when it is desired to control flow by external flow control means such as pumps.

The shaft further carries a helical blade 44, secured at one end to a collar 45 having a set screw 46, and welded at the other end to rotor 35, to loosen deposits of solid matter from the housing and permit it to be flushed out with the effluent. An inlet nozzle 47 communicates with the housing near this blade.

In operation, the motor 18 is run to rotate the shaft 17 and the rotor blades at a desired speed, e.g., 300 to 1200 revolutions per minute, and liquid carrying solid matter entrained therein and containing constituents subject to deposition, which may be the said solid matter or may be precipitated or polymerized from the liquid state, is admitted continuously from the inlet at the top. The solids are disintegrated by the blades. To prevent the formation of deposits between the moving structures, e.g., such as would bridge the stator hubs 22 or 23 and the adjacent rotating parts, particularly cause seizure between the spacers 36 and the hubs of the rotor assemblies, a deposit-preventing fluid, e.g., a stabilizer or a solvent for the deposits is admitted via the tube 32, bore 31, passages 29 and grooves 37. The fluid flows out in both axial directions from these grooves and affords continuous protection of these parts against the formation of deposits such as would cause seizure of the relatively rotating parts.

Deposit-preventing fluid can be additionally admitted via the nozzle 47 to prevent the accumulation of deposits in the adjoining section of the casing.

The fluid may be any inhibitor or stabilizer which substantially prevents the formation of deposits on the walls of the disintegrator. Such a fluid inhibits polymerization in the stream and renders solid materials non-adherent. In the case of streams resulting from the polymerization of olefins, wherein the solids to be disintegrated as well as the solid matter subject to deposition is the gel of a synthetic elastomer, specifically a cross-linked polymer in the case of the butadiene polymerization previously mentioned, the stabilizer may be a member of the known class of rubber stabilizers, of which there are numerous members. Rubber stabilizers are often called inhibitors and among representative members may be mentioned para-butyl naphthyl amine, diphenyl-p-phenylenediamine, alkylated phenols (such as 2,6-di-tertiary-butyl-4-methyl phenol), bis-phenols and the like.

An example of a solvent suitable for the abovementioned streams is benzene.

By way of example, one part of diphenyl-p-phenylene-diamine (dissolved in 1–100 parts by weight of benzene) can be injected for every 1,000 to 8,000 parts by weight of a 10% solution of the polymer of butadiene in a hydrocarbon solvent. This was found to permit continued operation of the disintegrator for extended periods of over several weeks, at the end of which the disintegrator was still in excellent operating condition.

We claim as our invention:

1. Method of disintegrating solid materials entrained in a liquid stream, said stream containing freshly polymerized olefins subject to depositions on surfaces, which comprises the steps of flowing said stream through a disintegrator having a plurality of relatively moving parts which includes cutter blades, and injecting directly into the zone adjoining juxtaposed, relatively moving parts a fluid polymerization inhibitor for substantially preventing the formation of deposits on said parts.

2. Method according to claim 1 wherein said liquid stream is a solution of cis-1,4-polybutadiene in a hydrocarbon solvent, the said solid material is a gel consisting essentially of a cross-linked polymer of butadiene.

3. Method according to claim 2 wherein said inhibitor is diphenyl p-phenylamine.

4. Method according to claim 1 where said inhibitor is injected directly to a space between said relatively moving parts.

5. A disintegrator for comminuting solids carried in a liquid, wherein the material treated contains freshly polymerized olefins subject to deposition on walls, comprising: a housing having an inlet and an outlet and defining a flow passage therebetween; a rotor including a shaft mounted for rotation and extending longitudinally through said passage; stationary structure including stationary cutter blades extending from the vicinity of the housing wall inwardly toward said shaft; said structure having a passage extending from the housing and through at least one of said blades and open at a radially inner part of the blade structure; said rotor further including rotary cutter blades fixed to said shaft for movement in close proximity to the stationary blades; means for driving said rotor; and duct means for supplying a polymerization inhibitor to said passage at the housing for discharge in the immediate vicinity of the juncture of the rotor and the stationary blade structure to prevent deposition of said polymerized olefins.

6. A disintegrator for disintegrating solids carried in a liquid, wherein the material treated contains freshly polymerized olefins subject to deposition on walls, comprising: a housing having an inlet and an outlet and defining a flow passage therebetween, said housing having a longitudinal bore; a rotor including a shaft mounted for rotation and extending longitudinally through said passage; a plurality of stationary structures mounted at longitudinally spaced positions within said passage, each structure including stationary cutter blades extending from the vicinity of the housing inwardly toward said shaft; each said structure having a passage which communicates with said longitudinal bore in the housing, extends through at least one stationary cutter blade and opens adjacently to said rotor; said rotor including a plurality of rotary cutting blades fixed to said shaft, there being a cutter blade for each of said spaced positions situated to coact with a stationary cutter blade; said housing having an inlet channel in communication with said longitudinal bore for the admission to the passages in the said blade structure and discharge into the space between the said structure and the rotor of a polymerization inhibitor for substantially preventing the deposition of said polymerized olefins.

References Cited in the file of this patent

UNITED STATES PATENTS

| | | |
|---|---|---|
| 983,055 | Hosmann | Jan. 31, 1911 |
| 1,685,115 | Adams | Sept. 25, 1928 |
| 2,147,184 | Aasted | Feb. 14, 1939 |
| 2,435,411 | Soday | Feb. 3, 1948 |
| 2,462,123 | Nelson | Feb. 22, 1949 |
| 2,595,831 | De Nie et al. | May 6, 1952 |
| 2,615,010 | Troyan | Oct. 21, 1952 |
| 2,862,895 | Cummings et al. | Dec. 2, 1958 |
| 2,954,173 | Dunwody | Sept. 27, 1960 |
| 2,970,990 | Cines | Feb. 7, 1961 |

FOREIGN PATENTS

| | | |
|---|---|---|
| 542,788 | Belgium | Nov. 30, 1955 |
| 885,770 | France | June 7, 1943 |